July 11, 1950  E. E. ALMY  2,514,984
SAFETY BELT
Filed May 12, 1947

Inventor
EUGENE E. ALMY
By Earl E. Moore
Attorney

Patented July 11, 1950

2,514,984

UNITED STATES PATENT OFFICE 2,514,984

SAFETY BELT

Eugene E. Almy, Sherman Oaks, Calif.

Application May 12, 1947, Serial No. 747,515

10 Claims. (Cl. 128—134)

This is an invention for a safety belt for children and is an improvement over applicant's invention as expressed in his patent application filed November 6, 1946, bearing Serial Number 708,066 and of which this application is a continuation in part. This instant application differs from the former one in that the belt is adjustable without the use of rough parts that may be a hazard to an infant, and means are provided for ventilating the belt.

One of the principal objects of this invention is to provide a special adjustable belt means to secure an infant in its crib, but, nevertheless, allowing the infant full freedom for turning from side to side as well as completely around without any danger of becoming twisted in the bed clothes or becoming trapped beneath the bed clothes. The invention is by no means limited to use in a crib, as it has many other uses, for instance, the device of this invention may be employed upon a leash in order to limit the straying distance of a child from a certain fixed point, or it may be employed to give proper support for a child while the child is learning to walk, etc.

Another object is to provide a safety belt which is simple and sturdy in construction, which is reliable to give perfect and long service, and which is economical to make and manufacture.

Other objects, advantages and features of my invention will appear from the accompanying drawings, the subjoined detailed description, the preamble of these specifications and the appended claims.

Applicant is about to illustrate and describe one of the forms of his invention in order to teach one how to make and use the same, but it is to be understood that the drawings and description thereof are not to limit the invention in any sense whatsoever, except as limited by the appended claims.

The particular belt device illustrated in this application may be provided with any number of suitable fasteners and auxiliary adaptations to make it more suitable for some particular uses. The material employed may be of any type and class which will provide the necessary parts of the belt. Such material may include pliable leather, any of a number of various plastics and fabrics, and laminated strong and pliable papers and the like.

Figure 1:
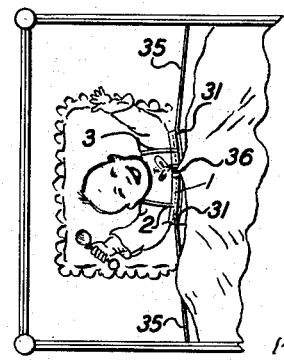
Fig. 1 shows the invention as applied to a baby in a crib.
Figure 5:
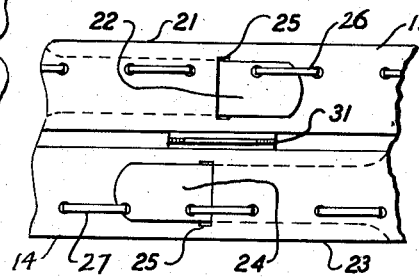
Fig. 5 is an elevational view of a fractional part of the invention.
Figure 4:
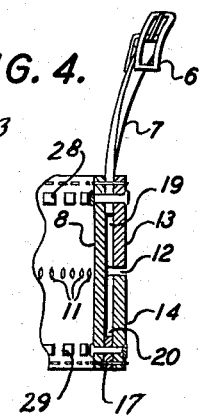
Fig. 4 is another sectional part of Fig. 2 and taken substantially along the line 4—4 thereof.

As shown in Fig. 1, the invented belt is dressed upon the upper torso portion of a baby, the main belt portion or girdle part 1 being supported or/and positioned by the straps or suspender-like bands 2 and 3 which cross at the point 4 and may be provided with a double headed stud to prevent displacement of the pivot point. The rear ends of the straps are anchored to the belt 1 in any suitable way such as sewing them securely between portions of the belt. Each forward end of the straps has a plurality of holes 5 which are adapted to receive the tongues of their respective buckles 6. The buckles 6 are sewed or otherwise firmly fixed to the top portions of the belt by short straps 7, as shown.

Figure 2:
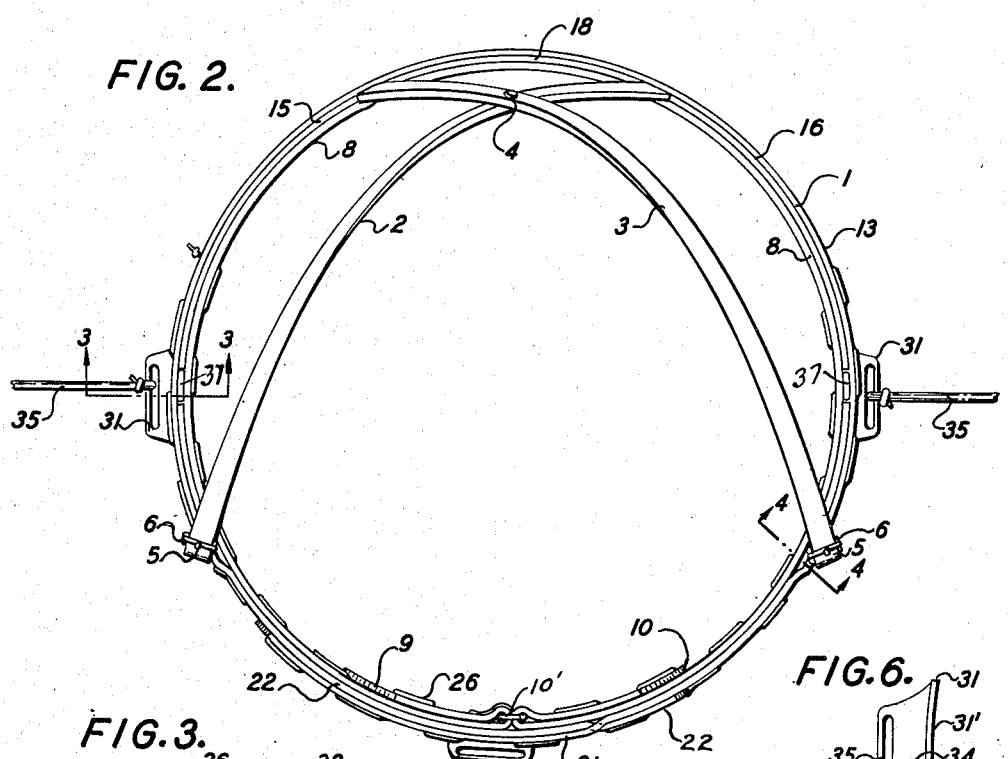
Fig. 2 shows the inventive belt in plan view and drawn to a large scale.
Figure 3:
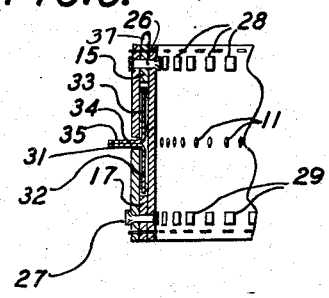
Fig. 3 is a sectional part of that shown in Fig. 2 and taken substantially along the line 3—3 thereof.
Figure 6:
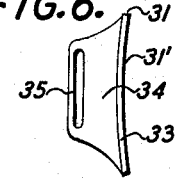
Fig. 6 is an elevational view of a sliding element employed in the safety belt.

The main body of the belt consists of an inner band 8 having the ends 9 and 10 which are doubled back on themselves, the amount of fold depending upon the desired circumference of the belt, but for normal use the ends 9 and 10 are formed as shown in Fig. 2 of the drawings. A rectangular shaped metal or plastic strap element 10' is provided to hold the band folds in place. To prevent band-sweat, this inner band 8 is provided with a plurality of ventilating holes 11. These holes are positioned opposite the slot 12 which is provided by the slightly spaced apart upper and lower outer bands 13 and 14, respectively. The upper band 13 is slightly spaced from the inner band 8 by the top spacer strips 15 and 16 and the lower band 14 is slightly spaced from the inner band 8 by the spacer strip 17. These top spacer strips extend from the short straps 7 to their respective rear shoulder straps 2 or 3; a short spacer strip 18 being provided between the rear ends of the shoulder straps. The lower spacer strip 17 is a single piece and extends around the rear portion of the belt from points just beneath the short straps 7 and other portions where required. This construction provides a track having an upper and lower annular slide passage 19 and 20, respectively; and these passages are maintained in the front portion of the belt by the extended end portions 21 and 22 of the top outer band 13 and the similar extended end portions 23 and 24 of the lower outer band 14.

The end portions 21 and 23 of these outer bands each have a strap slot 25 and they are wider than their respective other ends so that the end portions 22 and 24 can be passed through their respective slots 25 in the wider band portions. This construction of the outer bands in conjunction with the free ends 9 and 10 of the inner band makes it possible to shorten or lengthen the circumference of the girth portion of the belt so as to neatly fit the upper torso portions of an infant and allow for quite a variation in girth sizes, and this is done without destroying the continuity of the endless track or upper and lower passages 19 and 20. Whenever the size is once set, the inner and outer bands are laced together by the upper and lower laces or strings 26 and 27. To accommodate the laces, the upper and lower edges of the end portions of the inner band 8 are provided with holes 28 and 29, and each end portion of the outer bands is provided with alined holes to receive the lacing strings.

Within the passages 19 and 20 there are a plurality of removable sliding elements 31 which are disc-like and have side wings, fins, or flanges 32 and 33 which neatly and snugly fit within the passages so as to allow the extending body portion 34 to slide along the continuous slot 12 and completely circle the body of the wearer should each element 31 be fastened by a cord, for instance, by the cord 35 to any suitable side portion of a crib or bed. Each element has an elongated opening 35 so that cords can be securely tied thereto, or a safety pin passed therethrough for fastening one of the elements to the top end of the bed clothes as indicated at 36 in Fig. 1. This construction allows an infant to rotate in its crib and turn completely around without in any way disturbing the bed clothes, and it prevents the infant from becoming trapped under the bed clothes. Note, that the top and bottom surfaces of the fins 32 and 33 are slightly bowed to provide a gentle arc that rides freely within the curved track or passages 19 and 20. Also note, that the sliding elements 31 are removable from their track by bending the bands 13 and 14 from the rear band 8, but these elements cannot be removed easily without bending away the outer bands 13 and 14.

Any number of suitably fixed rings 37 may be provided along the top or bottom edges of the belt for the obvious use of providing a leash etc.

It is, of course, understood that various changes and modifications may be made in the details of form, style, design and construction of the whole or any part of the specifically described embodiment of this invention without departing from the spirit thereof, such changes and modifications being restricted only by the limitations clearly expressed in the following claims.

I claim:

1. In a safety belt and the like for infants and others, a girdle having shoulder straps for holding it up in proper position upon an infant's body, an endless annular track in the girdle having an open slot, slide elements in the slot comprising a thin body portion with lateral extending fins which ride in the track, and means on the body portion for attaching things thereto.

2. In a belt device comprising a girdle with an inner band having spaced apart outer bands fixed to the inner band to form an endless track and slot means circumflexing the inner band, a plurality of slide elements in the track, and tongue and lacing means for adjusting the circumference of the girdle and maintaining the endless track for said slide elements.

3. In a belt adapted to encircle a person's body, the belt comprising a girdle having an inner band and a pair of outer bands spaced therefrom and from each other, the inner band having a pair of free ends adapted to be folded back on themselves, a plurality of lacing openings in the front portions of the inner band, each of said outer bands having a pair of free ends which lap over each other, a plurality of lacing openings in the front portions of the outer bands, and lacing means passing through the lacing openings.

4. In a safety belt for persons, the belt comprising a girdle with an inner band and a pair of outer bands spaced from the inner band and from each other to provide an annular slot, means spacing the outer bands from the inner band to provide an upper and a lower circular passage way, said outer bands and inner band having free ends so that each band can be individually adjusted as to girth, a plurality of lacing means for fastening the outer bands to the inner band, a sliding element having side wings which ride in said passage ways, the element having a protruding portion extending through the slot.

5. The belt recited in claim 4 wherein the sliding element has its wings slightly curved so as to better slide in the circular passage ways.

6. The belt recited in claim 4 wherein the inner band is provided with a row of ventilating openings in registration with the slot.

7. The belt recited in claim 4 wherein the inner band has means allowing each end thereof to fold back upon itself.

8. In a safety device for children, a belt having shoulder strap means for holding it to the upper portion of a child's body, an annular channelway in the belt having a slot opening onto the outer side thereof, a plurality of slidable disc-like elements in the channelway having means thereon for fastening a cord.

9. In a safety belt device for children comprising an annular belt with suspender-like straps to hold it in position upon a child's body, an annular channel in the belt having an open slot, and a plurality of slidable elements within the channel, each of said elements having a stem which extends through the slot and is equipped with eye means for making connection with a cord.

10. In a device for safely holding a child in its crib and for keeping bed clothes in position, the device comprising a belt-like band having an inner member which encircles the child and a pair of spaced apart outer members which are joined to the outer edges of the inner member and which together form an annular endless slot, an annular chamber between the inner and outer members which opens to the slot along its entire length, a plurality of sliding elements in the chamber having outwardly directed stems which project through the slot and are exposed for fastening cords to the ends thereof, and strap means attached to and extending upwardly from the belt for passing over the wearer's shoulders.

EUGENE E. ALMY.

REFERENCES CITED

The following references are of record in the file of this patent:

UNITED STATES PATENTS

| Number | Name | Date |
| --- | --- | --- |
| 312,045 | Claghorn | Feb. 10, 1885 |
| 1,697,363 | Losey | Jan. 1, 1929 |